Patented Jan. 10, 1939

2,143,413

UNITED STATES PATENT OFFICE 2,143,413

UREA RESIN MOLDING COMPOSITION AND PROCESS OF MAKING SAME

Carleton Ellis, Jr., Montclair, N. J., assignor to Plaskon Company, Incorporated, a corporation of Delaware No Drawing. Application October 31, 1935, Serial No. 47,613

1 Claim. (Cl. 106—22)

This invention relates to molding compositions containing urea aldehyde condensation products especially those in which the aldehyde is formaldehyde and particularly to the process of making preferably a dye- or color-containing composition of desired uniform coloration and composed of particles of a physical shape well adapted to rapidity of molding.

The composition will be exemplified as a stock for the molding of buttons but it will be understood that the material produced by the present invention may be utilized for making molded articles of other varieties.

The invention may be set forth as representing two phases or embodiments:—

(1) The manner of addition of dye or color when colored products are required.

(2) The production of the composition in desired physical form for ease of handling in molding operations, especially for preforming.

The invention contemplates the employment of a filler of the cellulose type but the addition of, in part, e. g., ground horn and also fillers of a mineral nature, is not precluded.

In order to make a white or light-colored product I prefer to use clean white cellulose such as alpha cellulose or bleached sulphite and the like, preferably ground or comminuted to the requisite state of division. Likewise I may add a small proportion of a white mineral pigment, e. g., titanium oxide, lithopone, and the like.

For a composition adapted to make buttons or similar articles which are generally colored to various hues, I find ground wood as wood flour suitable, since the yellowish or brownish tinge imparted to the molded article by the lignin or other mildly discoloring bodies present in this form of cellulose may be suppressed and overcome by the addition of a strong dye or pigment.

Thus a variety of shades of brown, blue, yellow, green, red, black, gray and so forth may be made when wood flour is used without any substantial impairment of color vigor resulting because of the presence of the ligneous substances of the wood.

The dried filaments or sheets, as the case may be, may be readily comminuted or crushed, cut and so forth to small dimensions sufficient to be put through a comminuting machine which will reduce the sandy granules to a very fine powder when such condition is desired. Such an operation may be needed particularly in the case of wood flour which frequently contains dark colored particles that show on the surface of molded articles which are not heavily dyed but which are light in color. By pulverization of these particles to an extremely fine condition, for example, of a size of say 2 or 3 microns in diameter or length, there will occur in molding so uniform a distribution of the wood impurities that a fairly good surface from the ocular standpoint results.

The manner in which I preferably incorporate the dye or color is to mill this coloring agent with the dry wood flour or purified finely divided cellulose flock, if the latter be used, in order that the coloring agent be intimately mixed with the cellulose fiber and so that, in the case of a dyestuff, particles of the latter will coat or adhere to the fibers thus to be in readiness on the addition of water or other dyestuff solvent, (in this case preferably the methanol and water portion of the formalin used in making the initial condensate) to dissolve and dye each fiber sufficiently to give the desired degree of color uniformity to the molded article.

During such dry milling of the coloring agent and fiber there may be added other auxiliary bodies such as mold lubricants, molding accelerators, plasticizers, and the like.

Meanwhile a suitable mixture of urea and formalin (usually containing about 30 to 40 per cent of reactive formaldehyde) is reacted to an initial stage of condensation forming a syrupy liquid. This syrup is mixed with the cellulose and dye composition to form a pasty mass, the proportion of the cellulose being such as to yield a suitable paste or extrudable plastic material. Usually I aim to prepare a mass which will on a dry basis contain about 30 to 50 per cent of cellulose, the urea resin forming the essential remainder of the total solids, but I may vary proportions as desired, even increasing the proportion of cellulose in some cases.

At this stage the mass may be dried in any suitable manner but in proceeding according to the preferred method of this invention I carry out the drying step by first passing the mass through an extrusion means so as to form strips, ribbons, rods or strings of the wet stock and allow these "noodles", "macaroni" and so forth to enter a drying chamber, or to fall onto a heated revolving drum or in any other suitable manner to expose the filaments, as they may be called, to heat (or heat and vacuum) in order to eliminate moisture, methanol (from formalin) and other volatile bodies as far as possible or feasible.

The operation of mixing, extruding, drying and crushing or cutting the sandy form may be carried out continuously and in the sequence indicated.

Preferably the stock is dried without material alteration of filament form and after drying these are given a more or less granular shape by crushing and screening or by chopping and screening if necessary.

Modern molding practice calls for dense material (to avoid bulky molds) which will flow readily in the hoppers of feeding units, much as dry sand flows, and which will not cake and pack as most powders do.

By chopping the strips of dried stock substantially a granular dense powder or granulated stock is obtained in a form particularly useful for rapid molding; that is, the powder must not pack in hoppers when fed to preforming units. In button molding and in many other molding operations a preform roughly shaped to correspond to the mold (cavity) is prepared and these preforms are placed in the individual cavities of the die, then hot pressed. A "sandy" texture of the molding composition is conducive to ease of feeding the preforming apparatus.

In special cases I may use various derivatives of urea and equivalent substances similarly or analogously reactive with formaldehyde. Thus, thiourea may sometimes be used especially to replace a part of the urea charged.

Although I prefer to produce the extruded material in strings or so-called filaments, I may also prepare sheets of the stock by extrusion, sheeting rolls or by other means.

In the preparation of molding compositions from urea resin and cellulose considerable difficulty arises during drying as the then hydrophilic nature of the initial condensate tends to cause a considerable retention of water. However, by preparing the composition in the manner noted and extruding in thin extrusions, drying takes place rapidly and effectively, being promoted by having the wet mass slightly acid or neutral. Alkaline conditions favor water retention and hence I prefer to avoid them.

As an illustration of one mode of preparing a syrupy liquid of initial urea condensate, the following will serve.

Dissolve 374 pounds of urea in 756 pounds of formalin of 37% strength and of pH 5.6. Add 6 pounds of dichlorhydrin and heat to boiling for a short time until a good degree of condensation is secured. Usually a few minutes suffice.

Mix in a ball mill or other mixer 300 to 500 pounds of wood flour, 25 pounds pigment and about 5 pounds of mold lubricant and/or preforming lubricant. After 3 or 4 hours milling dump the ball mill charge into a tank equipped with a stirrer and run in the urea resin syrup made as above. On mixing thoroughly the thick pasty mass assumes an extrudable consistency. Force this mass through an extrusion chamber to issue from outlets of about ⅛ inch or 1/16 inch diameter and propel the filaments through a drying chamber heated to about 70° C. Then pass the dried filaments through a chopper or cutter to obtain a "sand" or granules of an average diameter of, say, 1/16 or 1/32 of an inch.

The granules together with any accompanying dust form a molding composition which may be molded (pressed) for example in an automatic button press at 160° C. and 2,000 pounds pressure for 2 minutes.

It should again be noted that the customary way of making molded buttons and the like is to use preforms and that the state of dry-flowability engendered in the composition by the process of the present invention admits of ready feeding and shaping in preforming apparatus.

Urea resin molding compositions are difficult to eject from a preforming apparatus without the presence of a preforming lubricant which also may serve in many cases as a molding lubricant. Without such a preforming lubricant the preforms are liable to break or crumble on ejection.

From the foregoing it will be seen that one phase of the present invention relates to a process which comprises dry-milling cellulose fiber and a coloring agent preferably a dyestuff soluble in urea resin syrup, incorporating a substantially-aqueous urea resin initial condensate preferably of syrupy consistency and drying the product, whereby a substantially uniformly-colored composition is secured; the cellulose fiber preferably being unrefined cellulose specifically wood flour. The second phase of the invention relates to the step or steps which comprise mixing finely-divided cellulose and particularly an unrefined variety such as wood flour, with a substantially aqueous preferably syrupy urea-formaldehyde initial condensate with proportioning of the cellulose and urea resin syrup to form a pasty mass, shaping the product into sheets preferably more or less as filaments which is preferably accomplished by extrusion, drying the thin ribbons so extruded and comminuting the dried material to form a substantially granular or "sandy" powder of comminuted extrusions capable of flowing readily in the dry state from hoppers or other feeding devices supplying preforming molds; a flow which resembles considerably that of dry sand.

As a further modification I may replace a part of the wood flour and the like by ground or finely-divided horn, say to the extent of 25 to 50 per cent, in order to prepare a composition which when removed hot from the molds possesses sufficient elasticity at that stage to be "stripped", that is, sprung over and away from slight projections of the mold, such for example as the threads of bottle cap molds. It should be noted, however, that this elasticity exists only while the molded article is hot, such as results during molding, and that on cooling this property disappears to a very large extent. The addition of horn powder assists in providing the condition of heat-elasticity.

The pressure employed on the wet mass during the operation of extrusion is conducive to improved impregnation of the cellulose material and such enhanced degree of impregnation tends to augment the translucency of the molded article.

In some cases it may be desirable to extrude in such a manner as to afford granules of the required size directly before drying the material. In other words, an extrusion apparatus for example may be provided with comminuting means whereby the extruded material is cut to the required size before the drying step is carried out. However, since the pasty or plastic material from the extrusion apparatus may be slightly sticky, I prefer to cut or comminute the sandy form after the drying stage has been completed.

In those cases where a high proportion of cellulose or wood flour is employed and the amount of urea resin syrup in the initial stage of condensation as prepared, for example, according to the foregoing proves insufficient to wet and impregnate the cellulose material adequately, I may, as indicated, add water or other thining agent to such syrup to create the necessary degree of plasticity for extrusion. When resort is needed to this or otherwise I may sometimes first wet the cellulose material with a solution such, for example, as one containing a dye so that the cellulose is dyed and at the same time moistened sufficiently to enable the urea syrup on thorough mixing to make a suitable plastic for extrusion purposes. In fact the pre-dyeing of the cellulose may be carried out even if a high proportion of the cellulose material is not required in the finished composition. In general a major proportion of the urea resin and a minor proportion of the cellulose material is preferable when quick curing is desired.

Although a molding accelerator may be added to the urea resin syrup prior to or during condensation, I may incorporate at a later stage to advantage in some instances in order to avoid any deterioration of this curing catalyst during the heating operation preferably employed in the condensation of urea and the aldehyde. I may, however, carry out condensation at room temperature or at lower temperatures if desired, in which case the addition of a curing accelerator may not result to any appreciable extent in its premature decomposition.

Finally it should be noted that long fibered cellulose is not well adapted for the extrusion step since it tends to act somewhat as a filter, clogging the extrusion nozzles and preventing uniformity in the resulting composition. However by practicing the preferred step of the present invention, that of grinding the cellulose or otherwise comminuting it to break up the fibers sufficiently, pasty compositions can be made which extrude readily. The preferred form of the invention therefore contemplates destroying the fibrous character of cellulose to a considerable degree before incorporating it with the urea resin prior to the step of extrusion. It is, of course, possible to grind the cellulose in the wet state with the urea resin but preferably grinding is carried out with the cellulose in the dry form.

Although I prefer the extrusion process here noted after suitable milling of the cellulose fiber to render the resulting composition with the urea resin adequately extrudable, I may in some cases dry the composition by spray drying. Thus the milling of the cellulose may be carried to such an extent that when mixed with the urea-aldehyde resin syrup a fairly fluent composition results which may be passed through spray nozzles. On emerging from the nozzles the sprayed material comes in contact, for example, with a current of heated air and is dried to the requisite state of dryness.

What I claim is:

The process for producing molding compositions which comprises mixing finely divided cellulose fiber and an aqueous from neutral to slightly acid urea-formaldehyde initial condensate in proportions to form a pasty mass, subjecting said mass to extrusion, drying the extruded product and grinding the dried product to form a readily flowable granular heat-reactive product.

CARLETON ELLIS, Jr.